United States Patent
Simmer et al.

(10) Patent No.: US 12,303,905 B2
(45) Date of Patent: May 20, 2025

(54) MICROSCOPIC EXAMINATION DEVICE AND METHOD OF PREPARING A SAMPLE FOR MICROSCOPIC EXAMINATION

(71) Applicant: Leica Microsystems CMS GmbH, Wetzlar (DE)

(72) Inventors: Sebastian Simmer, Bischoffen (DE); Stefan Christ, Schoeffengrund (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 965 days.

(21) Appl. No.: 17/308,764

(22) Filed: May 5, 2021

(65) Prior Publication Data

US 2021/0354145 A1    Nov. 18, 2021

(30) Foreign Application Priority Data

May 12, 2020 (EP) .................................... 20174160

(51) Int. Cl.
*B01L 9/00* (2006.01)
*G02B 21/34* (2006.01)

(52) U.S. Cl.
CPC ................. *B01L 9/523* (2013.01); *B01L 9/54* (2013.01); *G02B 21/34* (2013.01); *B01L 2300/0829* (2013.01)

(58) Field of Classification Search
CPC .... B01L 9/523; B01L 9/54; B01L 2300/0829; B01L 3/5085; B01L 3/021;

(Continued)

(56) References Cited

U.S. PATENT DOCUMENTS 4,931,257 A * 6/1990 Quenin .................. B01L 3/021
248/222.12
5,290,521 A    3/1994 DeStefano, Jr.
(Continued)

FOREIGN PATENT DOCUMENTS

JP    S58158175 A    9/1983
JP    H02229553 A    9/1990
JP    2016-501534 A    1/2016

OTHER PUBLICATIONS

Dojindo et al. "Introduction to Intracellular Ca 2+ Measurement Protocol" Dojindo Laboratories, company publication, Apr. 20, 2019, Japan.

*Primary Examiner* — John McGuirk
(74) *Attorney, Agent, or Firm* — Patentbar International

(57) ABSTRACT

The present invention relates to a microscopic examination device comprising a microscope and a sample preparation arrangement for preparing one or more samples to be examined in said microscope, said preparing including pipetting one or more liquids into one or more sample receptacles for said one or more samples, said sample preparation arrangement comprising a base and a receiving structure adapted to receive said one or more sample receptacles, said sample preparation arrangement further comprising a pipetting guide movably fixed or fixable in relation to the receiving structure, said pipetting guide comprising one or more pipette guiding structures positionable in relation to said one or more sample receptacles by pivoting said pipetting guide in relation to said base. A method of preparing one or more samples for microscopic examination is also part of the present invention.

12 Claims, 11 Drawing Sheets

(58) Field of Classification Search
CPC ......... B01L 2200/025; B01L 2200/141; G02B 21/34; G01N 21/84; G01N 1/28; G01N 21/01

See application file for complete search history.

(56) References Cited

U.S. PATENT DOCUMENTS

| | | |
|---|---|---|
| 7,597,854 B1 | 10/2009 | Reynolds |
| 2014/0216579 A1* | 8/2014 | Bemis ................... B01L 3/5085 137/565.23 |
| 2015/0278625 A1* | 10/2015 | Finkbeiner ......... G02B 21/0088 348/79 |

* cited by examiner

MICROSCOPIC EXAMINATION DEVICE AND METHOD OF PREPARING A SAMPLE FOR MICROSCOPIC EXAMINATION

RELATED APPLICATIONS

This application claims priority to European Patent Application EP 20174160.0, filed May 12, 2020, which is incorporated herein by reference in its entirety.

FIELD OF THE INVENTION

The present invention relates to a microscopic examination device comprising a microscope and a sample preparation arrangement for preparing one or more samples to be examined in said microscope, wherein a pipetting guide is movably fixed or fixable in relation to a receiving structure for one or more sample receptacles, said pipetting guide comprising one or more pipette guiding structures positionable in relation to said one or more sample receptacles at least by pivoting said pipetting guide in relation to said base, and to a method of preparing a sample for microscopic examination.

BACKGROUND OF THE INVENTION

The present invention relates to pipetting liquids into sample vessels to be observed under a microscope, as e.g. required for adding stains, chemical or immunological reagents, growth factors, incubation, processing or embedding media, nutrient solutions or buffering and washing liquids. Samples correspondingly treated may include living or non-living samples of (micro)biological origin or non-biological materials which may be prepared or pretreated in any conceivable manner, e.g. by cultivating, sectioning, embedding, smearing and the like, and the term "sample", as used herein, may relate to any such material which may be examined, or prepared to be examined, for observation in a microscope.

The present invention particularly relates to cases in which one or more samples are received in one or more sample vessels, as further elucidated hereinbelow, and are treated by pipetting a liquid into the same vessel while the latter is received and optionally fixed in a receiving structure of a microscope stage of a microscope.

The microscope used in the context of the present invention may particularly be an optical microscope in inverse or inverted configuration, i.e. in a configuration wherein the sample, which may be positioned using a microscope stage, is irradiated with light from above and the sample is observed with microscope optics which is arranged below the sample. In such a configuration, the accessibility of the sample is generally improved as compared to conventional microscopes of the non-inverted type. However, the present invention is not limited for use with inverted microscopes as described but may be used with regular, i.e. non-inverted microscopes as well.

When pipetting liquids into sample vessels (e.g. the individual vessels of multiwell plates and Petri dishes) on a microscope stage or, more generally, a receiving structure for such sample vessels of a microscope arrangement, typically a hand-held and hand-guided pipette is arranged by hand to rest at an angle on the edge of the sample vessel and the liquid is injected, if possible without contact to a sample in the sample vessel, but with constant distance and contact to the vessel wall. A problem in such an approach is that the pipette is not securely guided during pipetting, such that user errors like contacting the sample with the pipette tip or inaccurate injection due to a loss of contact of the pipette tip with the vessel wall may result. Particularly with known multichannel pipettes, visual control of the pipetting process is difficult.

Be it noted that "pipetting", as referred to herein, is intended to refer to a liquid transfer process performed with a hand-held and hand-guided pipette equipped with exchangeable tips of standardized size, such a pipette and the exchangeable tips thereof being designed for taking up, dosing and decanting small volumes of liquid of typically 0.1 to 5000 microliters. A pipette used according to the present invention is, as being hand-held and hand-guided, not itself fixed to a structure connected with the microscope. The present invention does not relate to arrangements such as used for in-vitro-fertilization techniques and the like, wherein a (micro)pipette is fixed to and manipulated with a micromanipulator.

U.S. Pat. No. 5,290,521 A discloses a lab-top work station which is designed for use in the manual application of liquid to a slide or microwell plate and which consists of a slide holder, a bridge for support of manual liquid dispensers at a predetermined location with respect to the slide holder, and a manual incremental advance mechanism for manually moving the slide holder a predetermined distance.

A pipette guide for a standard well plate disclosed in U.S. Pat. No. 7,597,854 B1 includes reference characters to signify columns of wells exposed, an aperture for viewing those characters, a angled slot and open ended isolator for improved ergonomic function and visibility, a multilevel slide to help prevent contamination, and a bi-directional selection assembly for selecting a 96 or 384 well plate.

SUMMARY OF THE INVENTION

The present invention has the object to solve the problems mentioned above, i.e. to improve the process of pipetting liquids into sample vessels used for holding samples to be examined by microscopy, particularly in terms of ease of handling, precision, reproducibility and sample protection.

Against this background, the present invention provides a microscopic examination device comprising a microscope and a sample preparation arrangement for preparing one or more samples to be examined in said microscope, wherein a pipetting guide is movably fixed or fixable in relation to a receiving structure for one or more sample receptacles, said pipetting guide comprising one or more pipette guiding structures positionable in relation to said one or more sample receptacles at least by pivoting said pipetting guide in relation to said base, and to a method of preparing a sample for microscopic examination with the features of the independent claims. Preferred embodiments of the present invention are the subject of the dependent claims and of the description that follows.

BRIEF DESCRIPTION OF THE DRAWINGS

The present invention provides a microscopic examination device comprising a microscope and a sample preparation arrangement for preparing one or more samples to be examined in said microscope. As mentioned before, the microscope used in connection with the sample preparation arrangement according to the present invention is particularly an optical microscope such as a wide-field microscope equipped with optics for visual observation and/or observation using a camera. The microscope may comprise illumination and detection modalities as generally known in the art such as fluorescence, infrared and/or white-light light source and optionally corresponding detection modalities. The microscope may also be a scanning microscope such as a confocal microscope or may have any other configuration for illumination and/or detection, such as a light-sheet microscope adapted to provide a horizontal or slanted light sheet.

Preparing the sample as done according to the present invention includes pipetting one or more liquids into one or more sample receptacles for said one or more samples. For further details, reference is made to the explanations already given above. It should be noted once more that said pipetting is, according to the present invention, performed with a hand-held pipette of the type mentioned, i.e. a pipette that, other than a micropipette used in a micromanipulator, is adapted to be used freely and e.g. with standardized, exchangeable (plastic) pipette tips for defined volumes or volume ranges. The pipettable volume may, in a pipette used according to the present invention, be fixed or adjustable. The pipette may be a single-channel or multi-channel pipette. A single-channel pipette is adapted to be used with a single pipette tip and for pipetting one volume at a time, while a multi-channel pipette is adapted to be used with a plurality of pipette tips, particularly arranged at standardized distances for matching with corresponding multi-well plates with e.g. 6, 12, 24, 48, 96 or 384 wells known in the art. A multi-channel pipette is usable for parallel pipetting a plurality of fluid volumes.

Figure 1A:
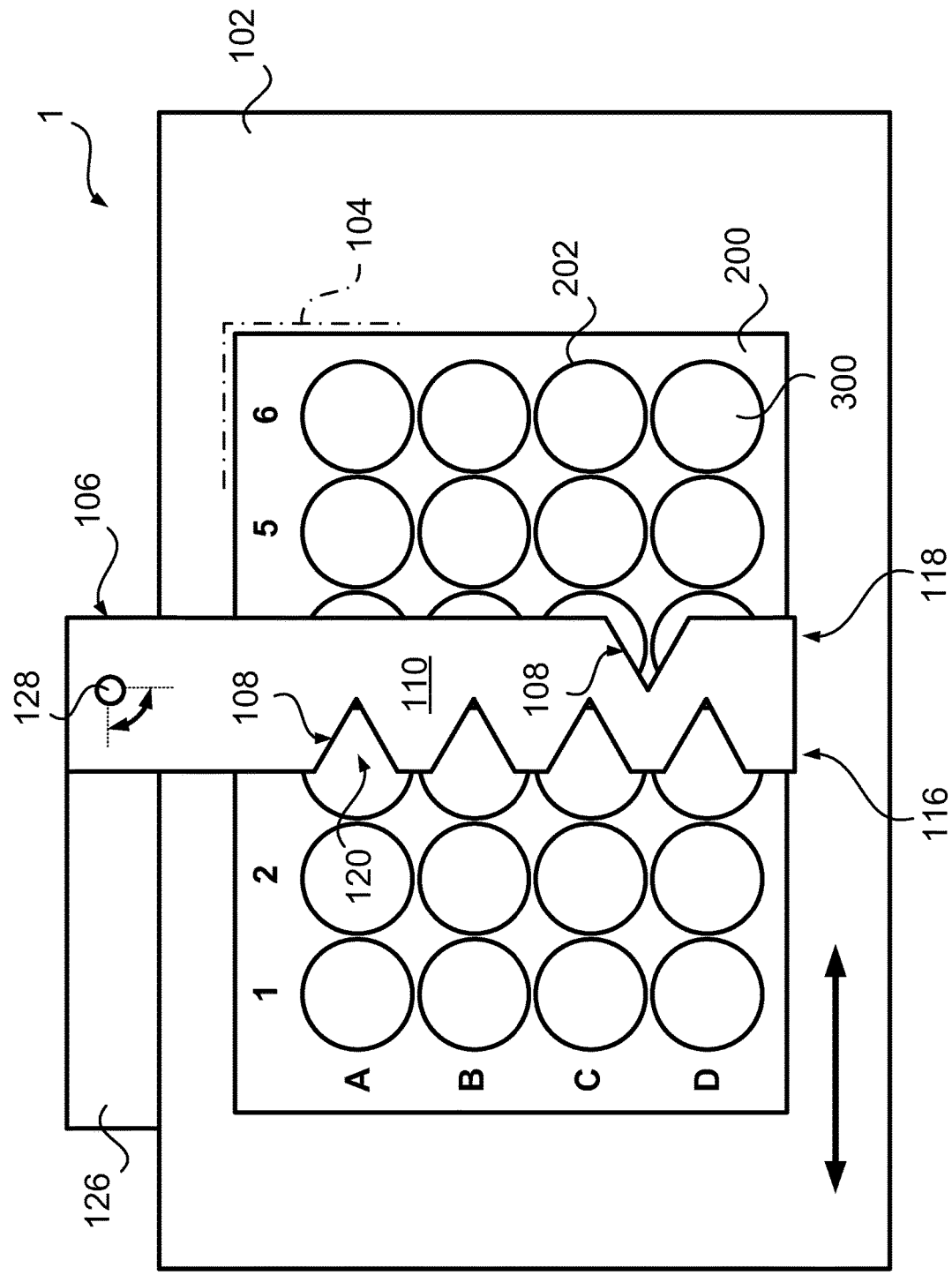

As also mentioned already, said pipetting is, according to the present invention, performed with a hand-held and hand-guided pipette which is, except for the measures provided according to the present invention described hereinbelow, freely movable and positionable, i.e. it may, except for being supported by a structure as explained hereinbelow, be freely moved and positioned by hand. Therefore, the present invention does not relate to pipettes which are fixed or removably attached to a positioning system such a micromanipulator which is adapted to position the pipette itself in relation to a sample or sample vessel.

The sample preparation arrangement according to the present invention comprises a base and a receiving structure adapted to receive said one or more sample receptacles. The base may particularly be a motorized or manually movable microscope stage adapted for horizontal and optionally vertical movement of a sample in relation to microscope optics or may be attached thereto or positioned in a fixed or movable relation therewith. The receiving structure may be a structure such as a recess, a well, a group of wells, a frame, a fence, a mechanical stop or a set of mechanical stops limiting a movement in at least one direction and the receiving structure may also be adapted to at least temporarily and/or releasably fix the one or more sample vessels against an unintended removal or displacement, particularly by forces exerted in the course of pipetting the liquid according to the present invention.

According to the present invention, the sample preparation arrangement further comprises a pipetting guide movably fixed or fixable in relation to the receiving structure. In the language used herein, "movably fixed or fixable in relation to the receiving structure" shall refer to a movable fixation to the base described above or to a structure which is movably or fixedly connected to the base or to which the base is movably or fixedly connected. For example, the pipetting guide may also be movably fixed or fixable to a housing enclosing a sample zone in which the one or more sample vessels may be positioned. Such a housing may particularly be adapted to be provided with a defined atmosphere and/or at a defined temperature. The pipetting guide may also be movably fixed or fixable to a microscope stand carrying the stage or a structure in which the receiving structure is formed or to which the receiving structure is attached, as essentially described above. In summary, the pipetting guide may be movably fixed or fixable to at least one of said base, an element connected with said base, a housing at least partially enclosing said base, and a structure at least partially holding said base, according to the present invention.

The pipetting guide provided according to the present invention comprises one or more pipette guiding structures positionable in relation to said one or more sample receptacles, particularly by moving the pipetting guide which is, as mentioned, movably fixed or fixable in relation to the receiving structure. As further explained below, such a positioning includes, according to the present invention, at least pivoting the pipetting guide in relation to the base such as to bring it into an operating position. Particularly, the pipetting guide moved accordingly may be locked in place when the one or more pipette guiding structures is or are positioned in relation to said one or more sample receptacles, in order to avoid an unintentional movement thereof, particularly by clicking or snapping it into place by suitable structures and/or by further locking structures being provided, such as locking pins or bars.

In other words, in a sample preparation arrangement of a microscopic examination device according to a preferred embodiment of the present invention, said pipetting guide may be arranged to be pivotable into an operating position in which said one or more pipette guiding structures is or are locked in position in relation to said one or more sample receptacles. The sample preparation arrangement of a microscopic examination device provided according to the present invention may thus be arranged such that said one or more pipette guiding structures is or are positionable by moving said pipetting guide and/or said receiving structure in relation to said base, e.g. by swivelling, flipping and/or pivoting around one more axes, particularly around an axis vertical to a sample surface which may be an axis vertical to a plane defined by an opening of the sample vessels.

According to the present invention, in other words, multi-channel and single-channel pipettes may be guided towards a wall of a sample vessel. For this purpose, the present invention provides the pipetting guide including the pipette guiding structures, particularly in the form of a swing-out pipetting aid which may be swivelled over the sample and locked in place.

In the sample preparation arrangement of a microscopic examination device according to a preferred embodiment of the present invention, said pipetting guide may comprise a flat region with a first surface and a second surface extending parallel to the first surface, wherein said one or more pipette guiding structures comprises or comprise one or more v-shaped material indents in one or more peripheric areas of said flat region. Particularly, two parallel lateral areas extending lengthwise along sides of the flat regions may be present, each carrying pipette guiding structures. Particularly, in one lateral area thereof there may be provided a pipette guiding structure in the form of a single v-shaped indent and in the other lateral region there may be provided a serrated structure comprised of several v-shaped indents for guiding a multichannel pipette. As mentioned below, the pipetting guide may be flipped over such that the v-shaped indents arranged accordingly may be positioned on the other side, particularly in order to selectively improve handling for left-handed and right-handed operators.

In the sample preparation arrangement of a microscopic examination device according to a particularly advantageous embodiment of the present invention, flanks of said one or more v-shaped material indents may be slanted in relation to said first surface and said second surface of said flat region to define an working angle for a pipette guided by said one or more pipette guiding structures. Particularly, each indent may be symmetrically angled so that the pipetting guide provides the same operating angle from both the top and bottom. This feature is particularly used, as mentioned, to adapt the pipetting guide for both left-handed and right-handed users and to switch between multi and single channel pipetting. Such an arrangement particularly also supports drop break-off at the tip of the pipette. In addition, the angled contact surface allows a targeted and uniform guidance of the pipette tip towards the wall of the sample vessel above the actual sample such that damage to the sample by the pipette tip may be avoided. In other embodiments, the flanks are not slanted, however.

As already mentioned above, therefore, the pipetting guide may be fixable to said base and/or said element connected therewith in a first orientation in which said first surface faces towards said one or more sample receptacles and/or in a second orientation in which said second surface faces towards said one or more sample receptacles, in order to provide said left-handed and right-handed operating position and/or said single-channel and said multi-channel operation.

In the sample preparation arrangement of a microscopic examination device according to the present invention, said receiving structure may advantageously be adapted to receive a plurality of sample receptacles in a geometrical arrangement to each other, and said pipetting guide comprises a plurality of pipette guiding structures, wherein positions of at least some of the plurality of pipette guiding structures correlate with the geometrical arrangement of the plurality of sample receptacles to each other.

The receiving structure may in this embodiment be adapted to receive a plurality of sample receptacles in the form of individual, i.e. non-interconnected, receptacles such as known sample caps of a size of e.g. 100 microlitres to 2 millilitres, particularly by having a corresponding plurality of receiving wells. That is, said receiving structure may comprise a plurality of wells being adapted to receive individual containers each forming one of the plurality of sample receptacles. However, the sample preparation arrangement may also be configured such that said receiving structure is adapted to hold and to receive a multiwell plate comprising the plurality of sample receptacles and defining said geometrical arrangement. The positions of at least some of the plurality of pipette guiding structures may correlate with this geometrical arrangement by being provided in an equidistant arrangement therewith and particularly also with a plurality of pipette tips of a multi-channel pipette.

In a different embodiment, the sample preparation arrangement of the microscopic examination device may also be configured such that said receiving structure is adapted to receive a single sample receptacle, and the one or more pipette guiding structures may correspond to one or more positions at a bottom of said single sample receptacle. Said single sample receptacle may particularly be provided in the form of a Petri dish or a rectangular culture vessel as typically used for cell cultures or a customer specific vessel that can adapt to the present invention.

Particularly, in the sample preparation arrangement of a microscopic examination device according to the present invention the receiving structure may be movable in relation to said base and to said pipetting guide via an actuator. The actuator may, in this configuration of the sample preparation arrangement, particularly be an electromotoric actuator operable on the basis of a signal in reaction to a user input.

In such an embodiment, the sample vessel or an arrangement of a plurality of sample vessels may previously defined by the user, e.g. in an operating software. Since pipetting is probably done with both hands, the sample or sample vessels can be moved relative to the pipetting guide to the next loading position by e.g. a voice command or a foot switch. Depending on the sample vessel or the arrangement of sample vessels, a start position may also automatically approached for loading.

The method of preparing one or more samples for microscopic examination provided according to the present invention is advantageous for the reasons given above, wherein said method comprises pipetting one or more liquids into one or more sample receptacles comprising said one or more samples, and wherein said method comprises using a sample preparation arrangement according to any one of the embodiments described hereinabove and/or a microscopic examination device as just mentioned, wherein said pipetting guide is used during said pipetting one or more liquids into said one or more sample receptacles by positioning a pipette therewith.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection such as internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Aspects of the present invention will hereinafter be described with reference to the appended drawings illustrating preferred embodiments thereof. It is to be noted that aspects of the invention described hereinbefore and hereinafter in isolation or in certain combinations may equally be used in other combinations or in in isolation as far as covered by the scope of the claims.

BRIEF DESCRIPTION OF THE DRAWINGS

FIG. 1A illustrates a sample preparation arrangement of a microscopic examination device according to an embodiment of the invention in a first configuration.

Figure 1B:
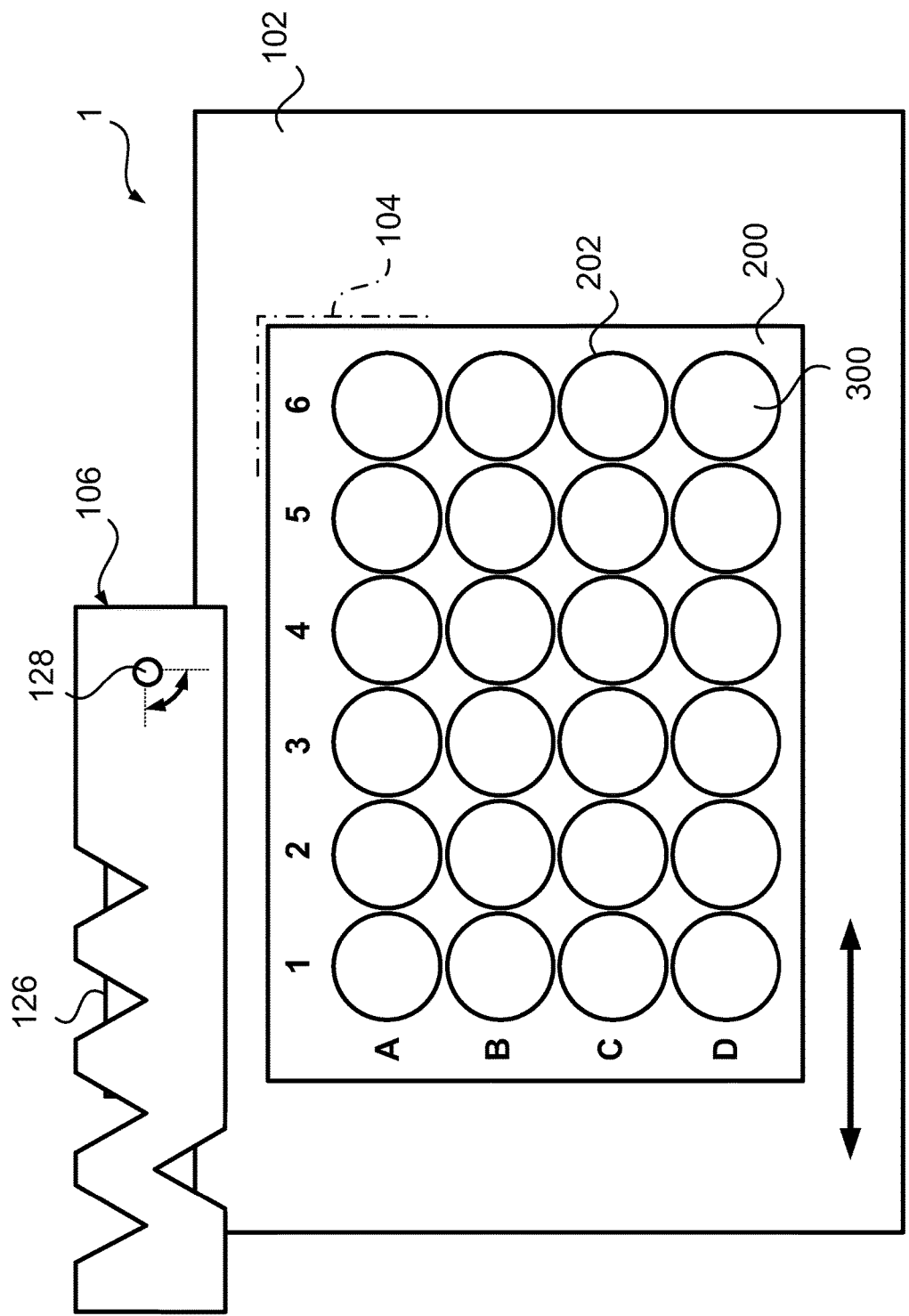

FIG. 1B illustrates a sample preparation arrangement of a microscopic examination device according to the embodiment of the invention shown in FIG. 1A in a second configuration.

Figure 2A:
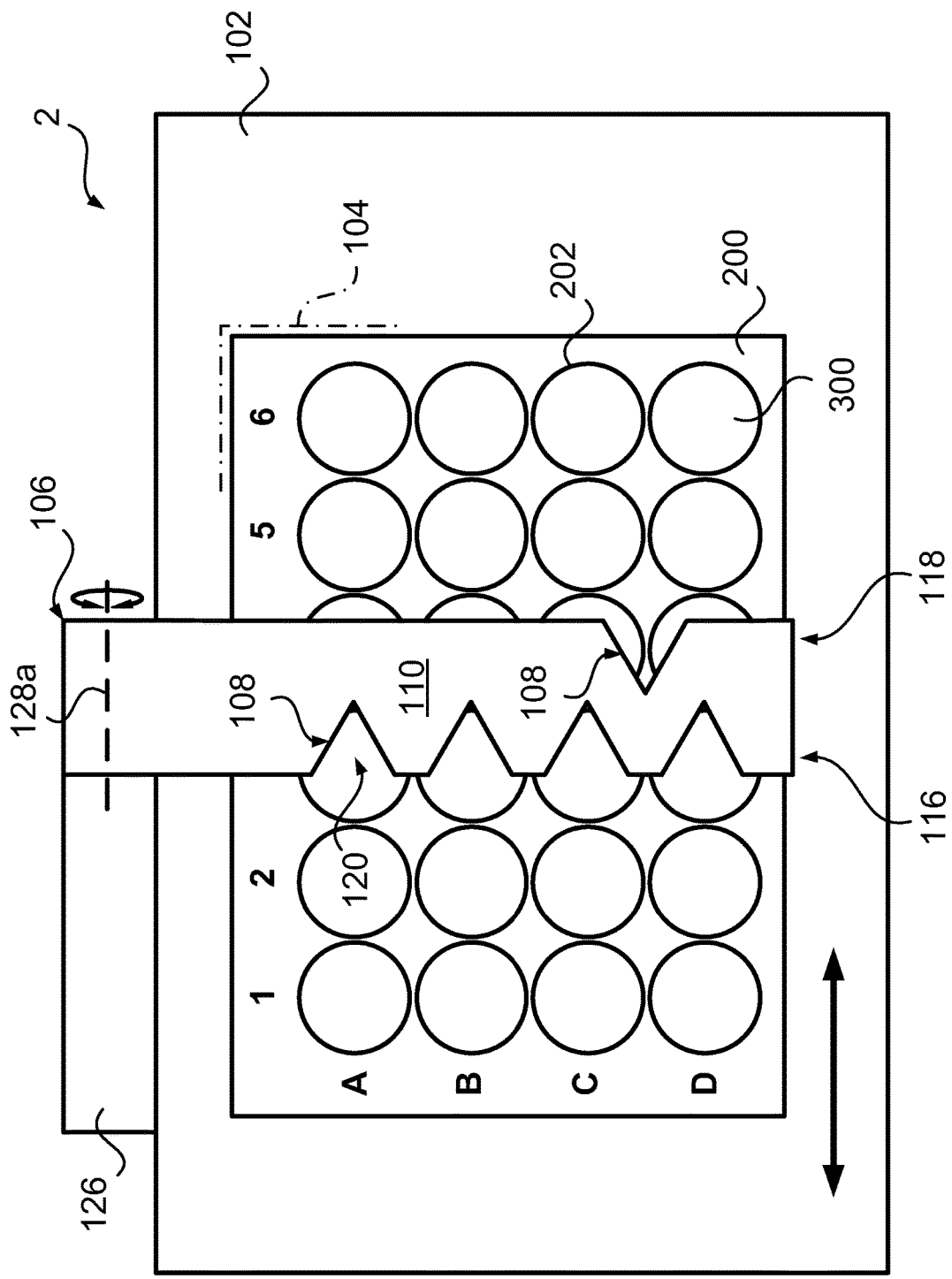

FIG. 2A illustrates a sample preparation arrangement of a microscopic examination device according to a further embodiment of the invention in a first configuration.

Figure 2B:
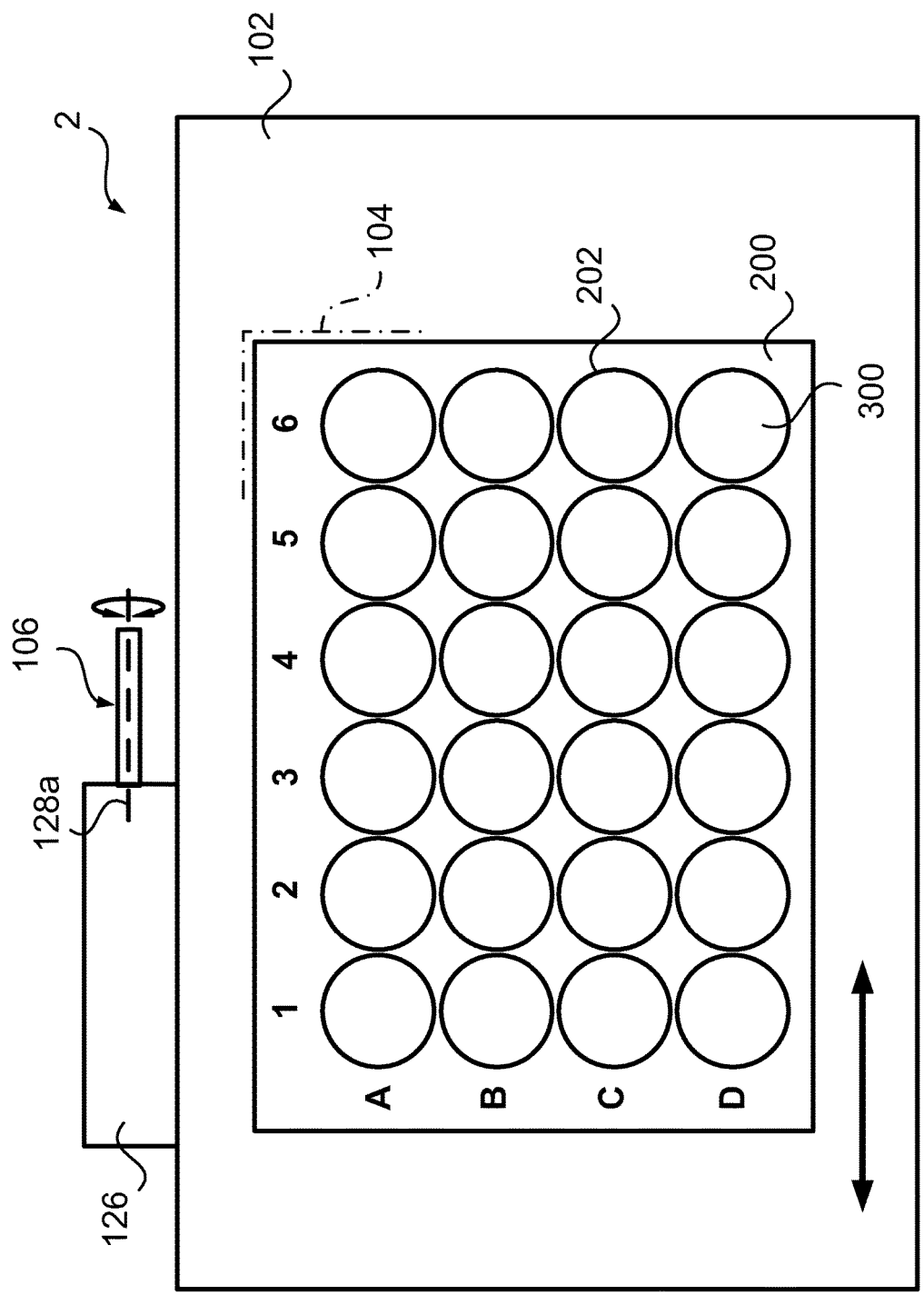

FIG. 2B illustrates a sample preparation arrangement of a microscopic examination device according to the embodiment of the invention shown in FIG. 2B in a second configuration.

Figure 3:
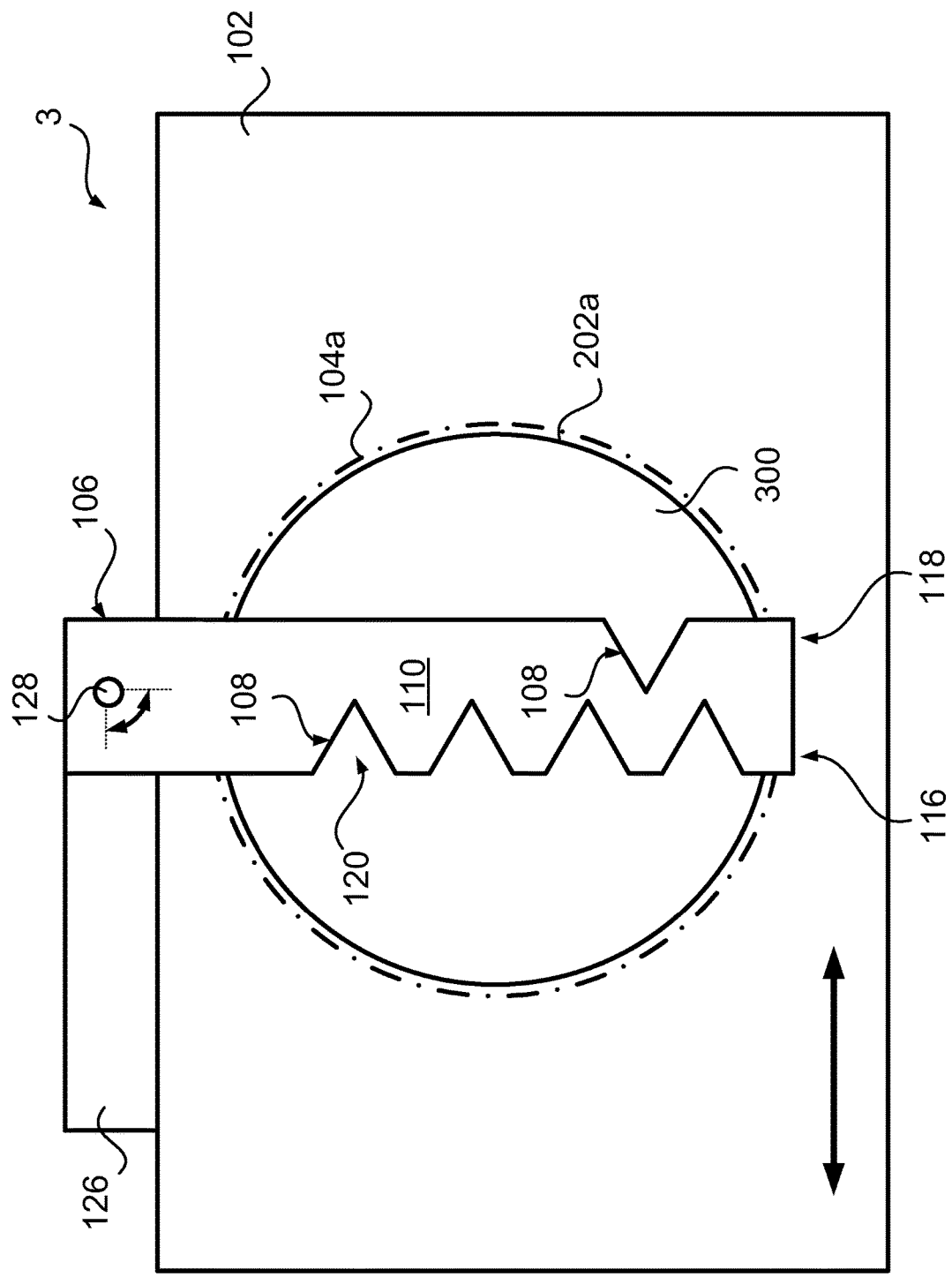

FIG. 3 illustrates a sample preparation arrangement of a microscopic examination device according to a further embodiment of the invention.

Figure 4:
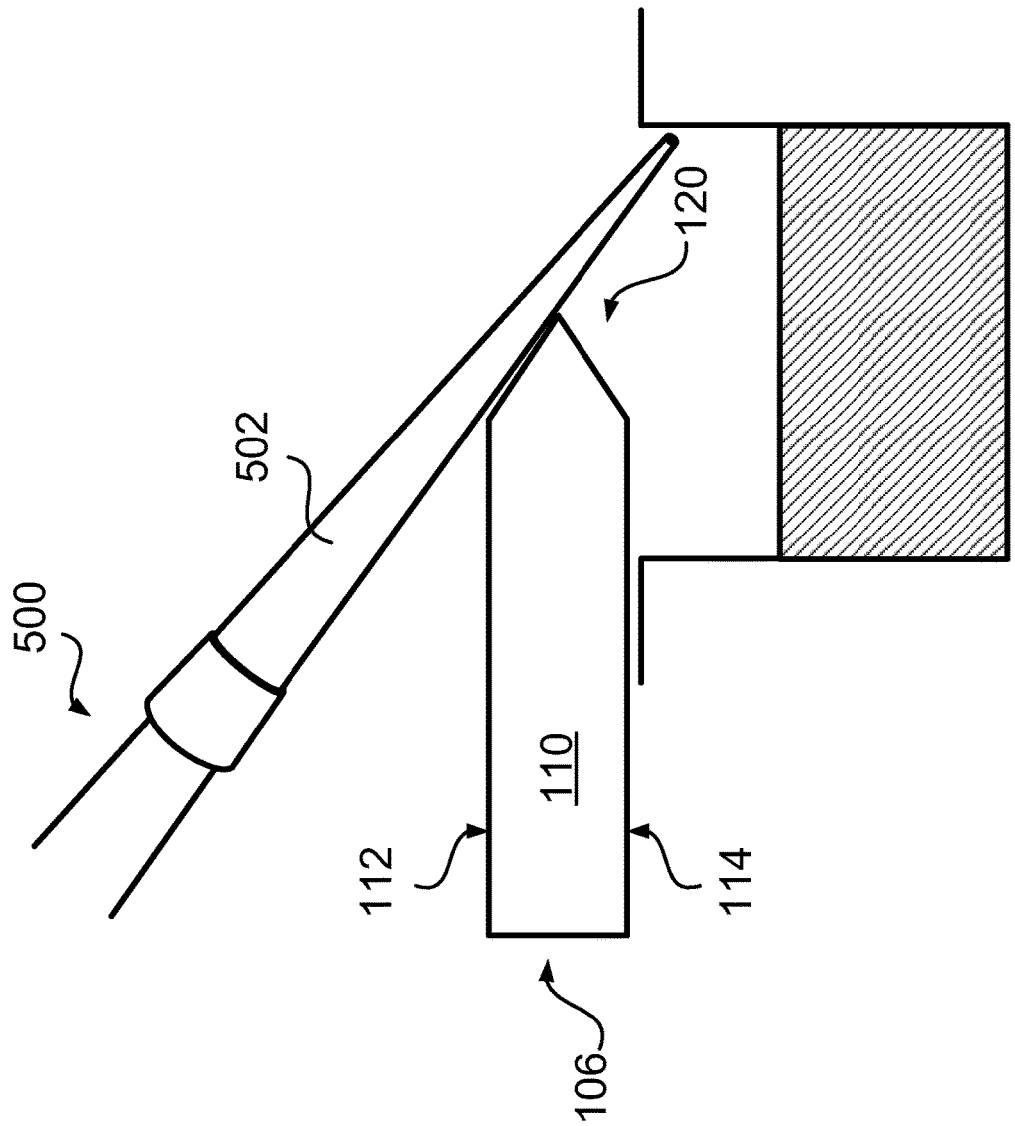

FIG. 4 is a sectional view through a pipetting guide of a sample preparation arrangement of a microscopic examination device according to an embodiment of the invention.

Figure 5A:
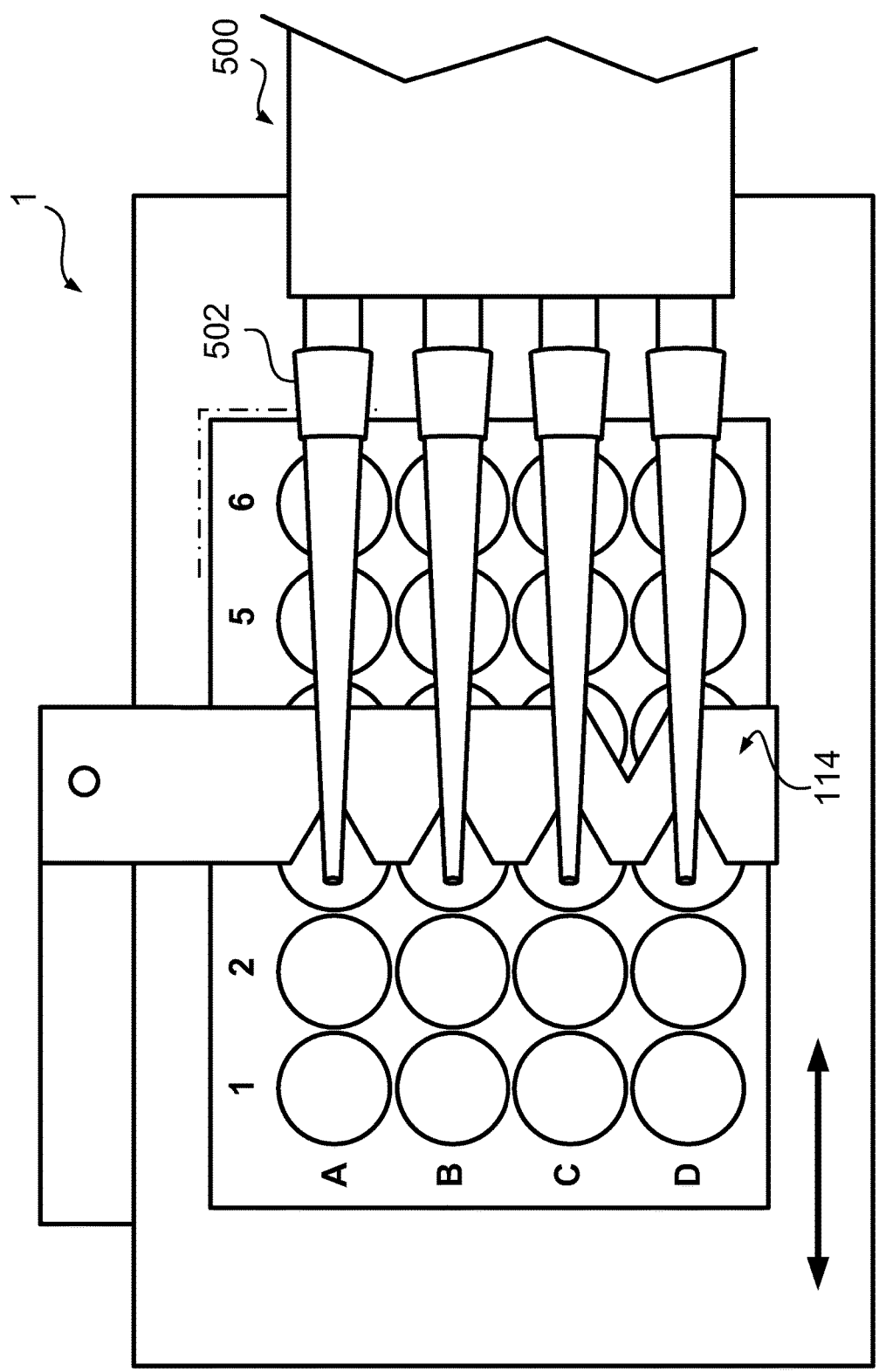

FIG. 5A illustrates a sample preparation arrangement of a microscopic examination device according to an embodiment of the invention in a first configuration used with a multi-channel pipette.

Figure 5B:
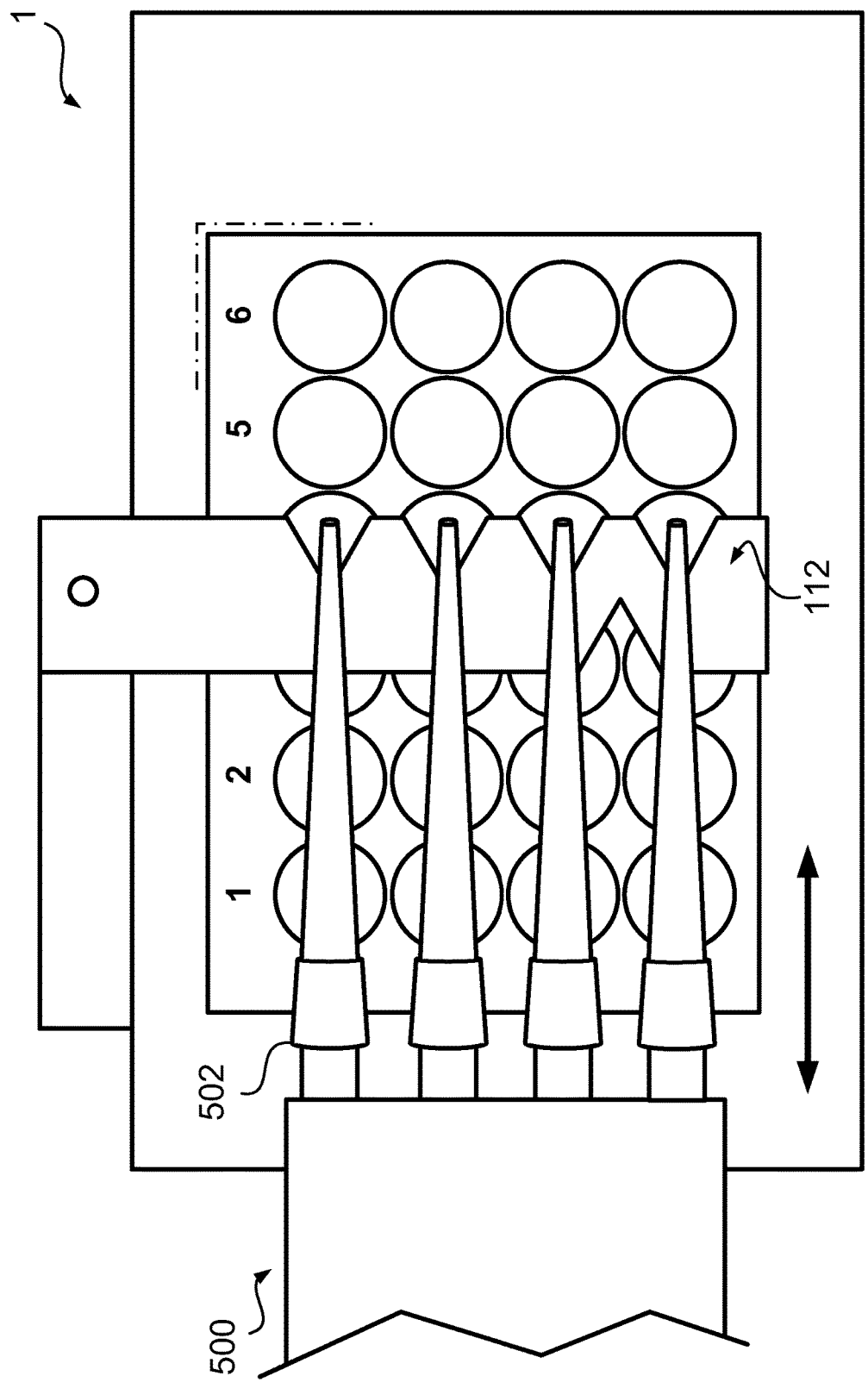

FIG. 5B illustrates a sample preparation arrangement of a microscopic examination device according to an embodiment of the invention in a second configuration used with a multi-channel pipette.

Figure 6A:
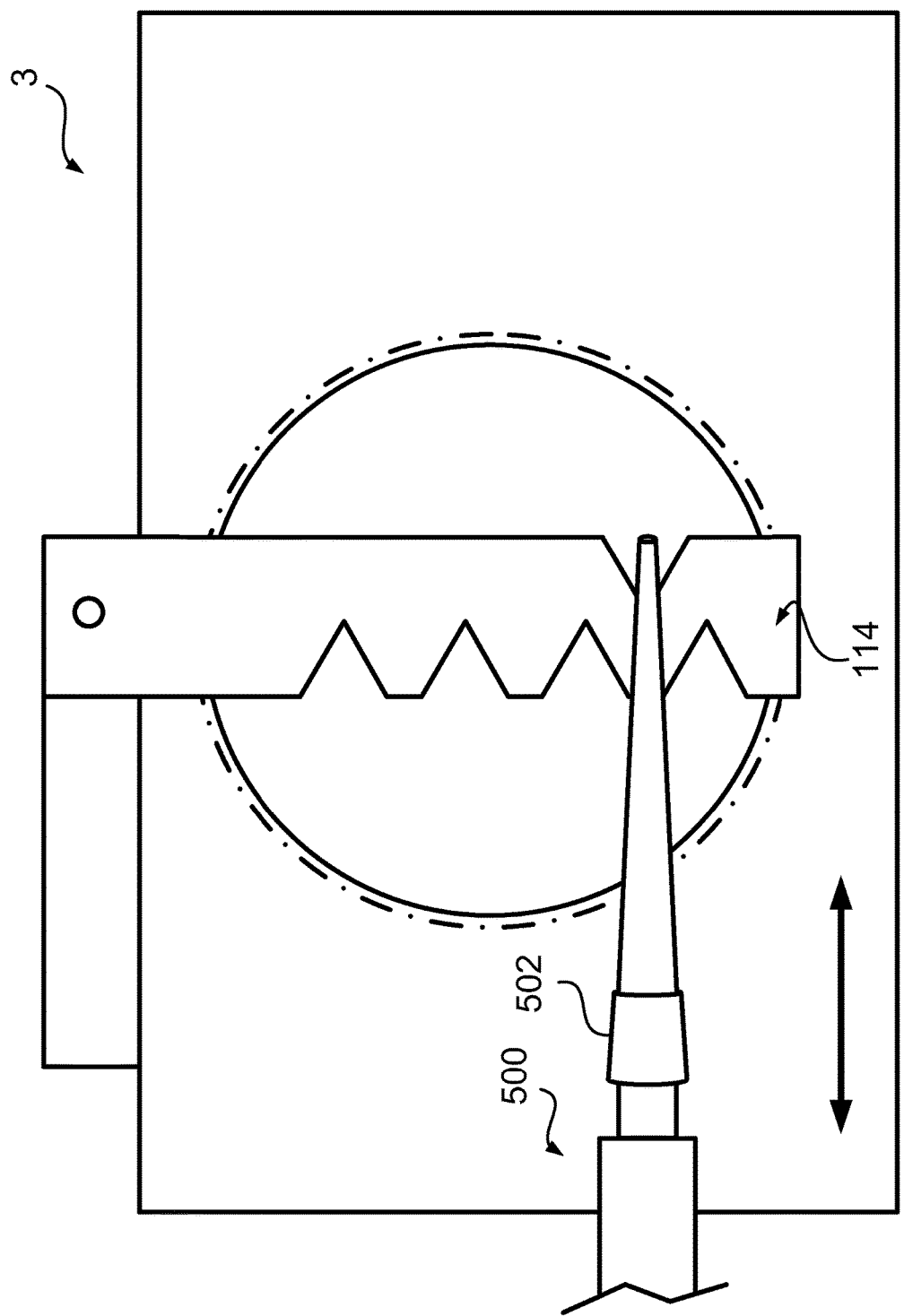

FIG. 6A illustrates a sample preparation arrangement of a microscopic examination device according to an embodiment of the invention in a first configuration used with a single-channel pipette.

Figure 6B:
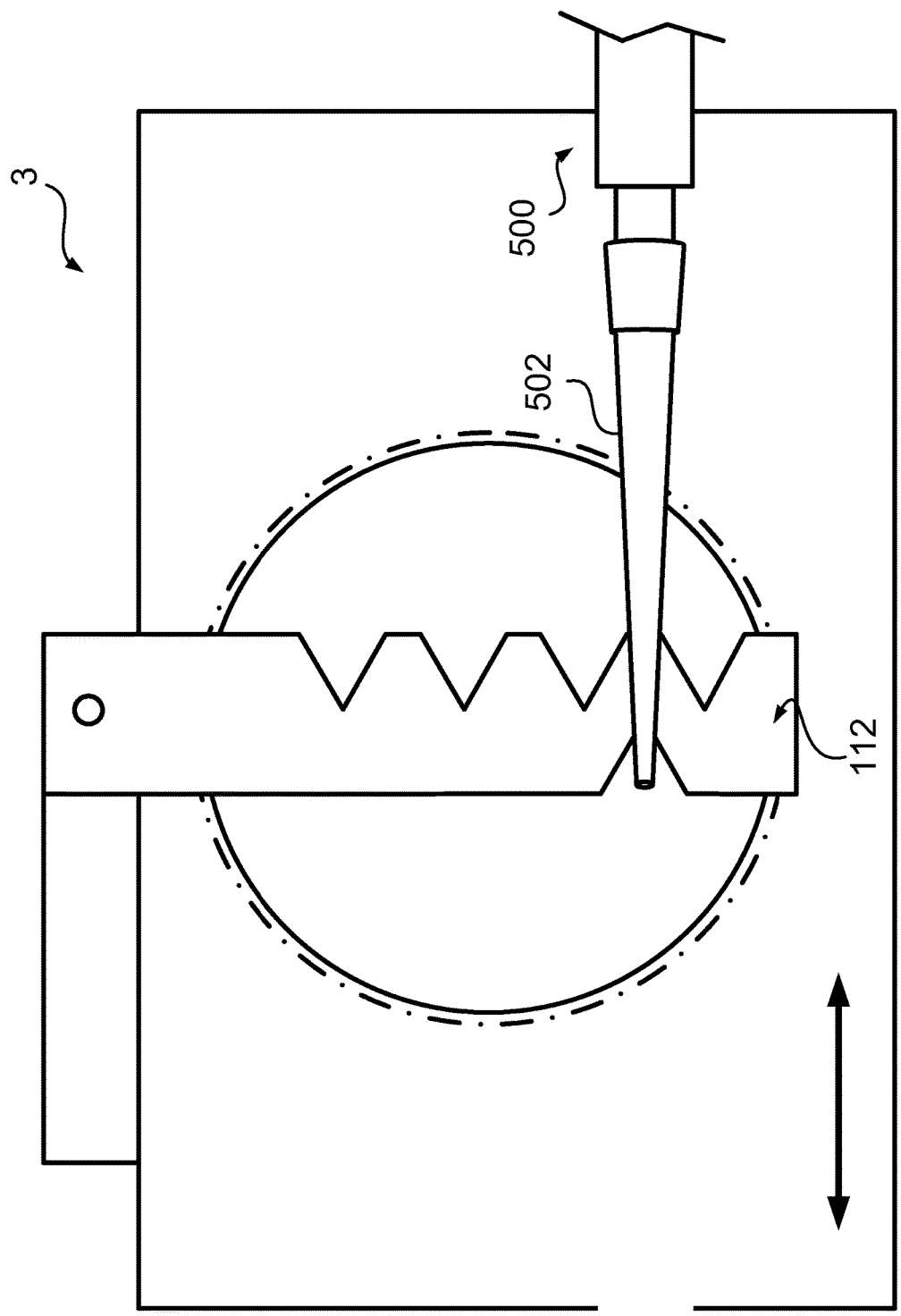

FIG. 6B illustrates a sample preparation arrangement of a microscopic examination device according to an embodiment of the invention in a second configuration used with a single-channel pipette.

Figure 7:
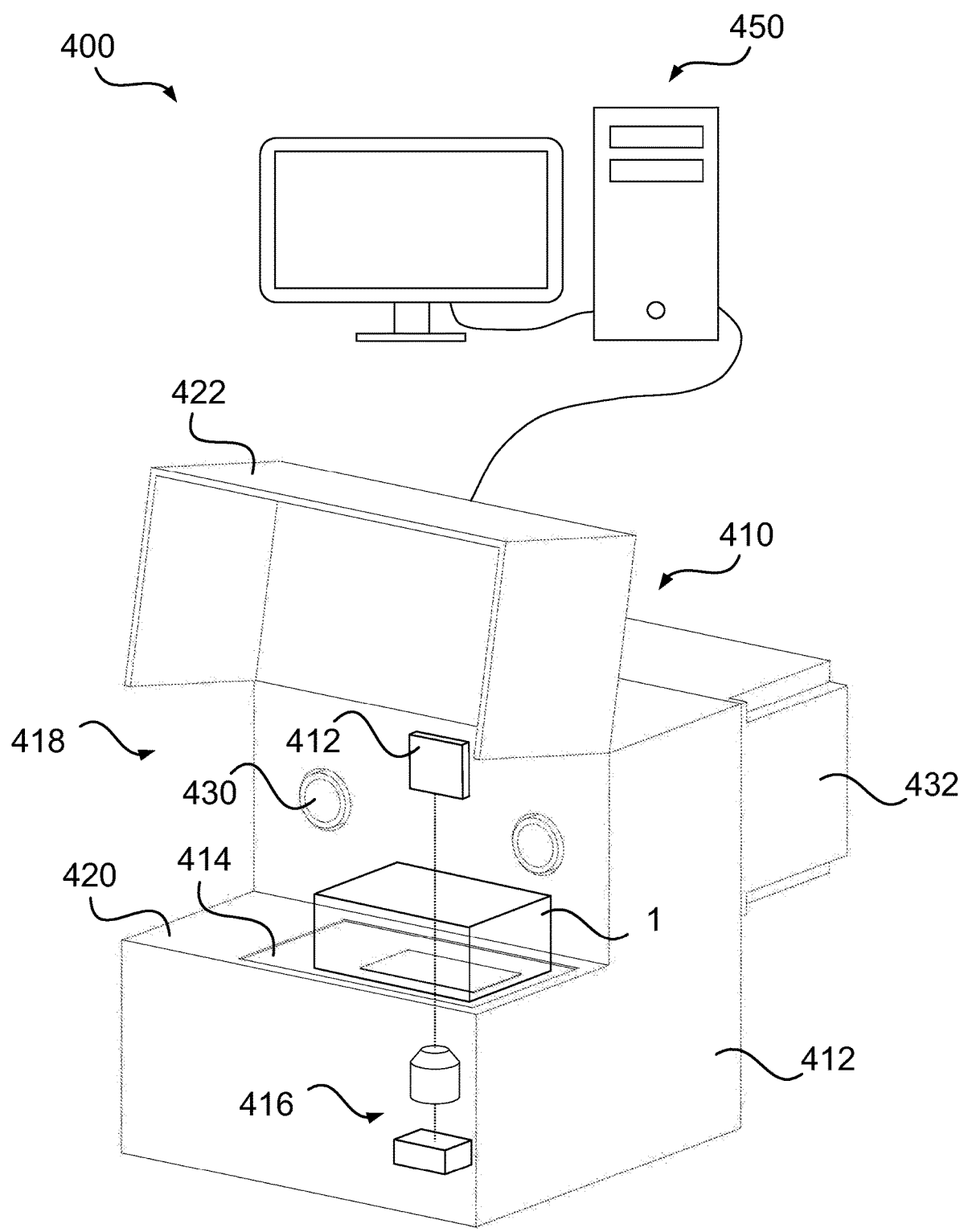

FIG. 7 illustrates a microscopic examination device according to an embodiment of the invention.

In the Figures, identical reference numerals are intended to refer to parts of identical or comparable configuration, design, construction and/or function and are not repeatedly explained for reasons of conciseness.

DETAILED DESCRIPTION OF THE PREFERRED EMBODIMENTS

FIGS. 1A and 1B illustrate a sample preparation arrangement of a microscopic examination device according to an embodiment of the invention in a first and in a second configuration. The sample preparation arrangement is designated 1 and may be part of a microscope in a microscopic examination device as shown in FIG. 6 below in more detail and in a specific embodiment. Not all reference numerals used in FIG. 1A are used in FIG. 1B as well for reasons of clarity.

The sample preparation arrangement 1 is adapted for preparing one or more samples 300 which, in the case shown in FIGS. 1A and 1B, is or are received in one or more sample receptacles 202, of which only one is indicated with a reference numeral, of a multi-well plate sample plate 200. While the multi-well sample plate 200 is shown here comprising 24 wells A1 to D6, it shall be understood that the present invention can particularly be used with multi-well sample plates with a different, and particularly larger, number of wells, as explained above.

The multi-well sample plate 200, and therefore the sample receptacles 202 thereof, are received in a receiving structure 104 which only schematically indicated for reasons of generality. As mentioned, the receiving structure 104 may e.g. comprise a recess, a well, a group of wells, a frame, a mechanical stop or a set of mechanical stops limiting a movement of the multi-well sample plate 200 and therefore the sample receptacles 202 thereof, and it may comprise further means for limiting a movement as explained hereinabove. The receiving structure 104 is formed, in the example shown, in a base 102 which may e.g. be a surface of a microscope stage or a part thereof or of a other structure of a microscope.

Said sample preparation arrangement 1 further comprises, as shown in FIGS. 1A and 1B, a pipetting guide 106 which is movably fixed in relation to the receiving structure 104.

As shown, the pipetting guide 106 is movably fixed to a holding element 126 which is in turn connected with the base 102. It may, in other configurations, also be fixed or fixable to a housing at least partially enclosing said base 102 and/or a structure at least partially holding said base 102, as shown in FIG. 7.

In the example shown, the pipetting guide 106 comprises a plurality of pipette guiding structures 108 which are positionable in relation to said one or more sample receptacles 202. As shown, the pipetting guide 106 is positionable by moving the pipetting guide 106 by pivoting it into an operating position in which the pipette guiding structures 108 are locked in position in relation to said one or more sample receptacles 202 around an axis 128 vertical to said base or a surface thereof. This is illustrated with a quarter-circular arrow. A configuration in which the pipetting guide 106 is pivoted to be in the operating position is shown in FIG. 1A while a configuration in which the pipetting guide 106 is pivoted not to be in the operating position but in a position which may be used to load the receiving structure 104 with the one or more sample receptacles 202 is shown in FIG. 1B. Alternatively, such a positioning may also be performed by moving the receiving structure 104 in relation to the base 102.

As particularly visible in connection with FIG. 4 showing a sectional view through the pipetting guide 106, the pipetting guide 106 comprises a flat region 110 with a first surface 112 and a second surface 114 extending parallel to the first surface 112, and the pipette guiding structures 108 are formed as v-shaped material indents 120 in peripheral areas 116, 118 of said flat region 110. As again visible in FIG. 4, in which one of the v-shaped material indents 120 is sectioned at the tip (i.e. at the point of maximum indentation), the v-shaped material indents 120 are slanted in relation to said first surface 112 and said second surface 114 of said flat region 110 to define an working angle for a pipette 500, guided by said one or more pipette guiding structures 108. In FIG. 4, a distal end of the pipette, to which a pipette tip 502 is attached, is schematically illustrated.

As illustrated in FIGS. 1A and 1B by a horizontal double-arrow, the base 102 may be moved in relation to the pipetting guide 106 in an embodiment of the present invention, in order to position other sample vessels for pipetting. Such a positioning can be performed by means described in more detail above.

FIGS. 2A and 2B illustrate a sample preparation arrangement according to a further embodiment of the invention in a first and in a second configuration. The sample preparation arrangement is designated 2 and may also be part of a microscope in a microscopic examination device as shown in FIG. 6 below in more detail and in a specific embodiment. Again, not all reference numerals used in FIG. 2A are used in FIG. 2B as well for reasons of clarity.

The sample preparation arrangement 2 is essentially designed like the sample preparation arrangement 1 shown in FIGS. 1A and 1B. However, in the embodiment shown in FIGS. 2A and 2B, the the pipetting guide 106 is positionable by moving the pipetting guide 106 by pivoting it into an operating position in which the pipette guiding structures 108 are locked in position in relation to said one or more sample receptacles 202 around an axis 128a which is arranged parallel to said base or a surface thereof, i.e. parallel to the paper surface. This is illustrated with an arrow around the axis 128a. Again, a configuration in which the pipetting guide 106 is pivoted to be in the operating position is shown in FIG. 2A while a configuration in which the pipetting guide 106 is pivoted not to be in the operating position but in a position which may be used to load the receiving structure 104 with the one or more sample receptacles 202 is shown in FIG. 2B.

FIG. 3 illustrates a sample preparation arrangement 3 of a microscopic examination device according to an alternative embodiment of the invention. In contrast to the embodiments shown in the preceding Figures, the sample preparation arrangement 3 shown in FIG. 3 is arranged to receive a single sample receptacle 202a, such as a Petri dish or alternatively a customized vessel adapting to the present design, in a receiving structure 104a which is accordingly configured. For further explanations, reference is made to the explanations in connection with the preceding Figures. The axis 128 shown in connection with the sample preparation arrangement 3 according to FIG. 3 may in an alternative embodiment be arranged like in FIGS. 2A and 2B.

FIG. 4 illustrates a sectional view through a pipetting guide 106, such as the pipetting guide 106 shown in the preceding Figures. For further explanations, which also apply to different configurations of sample preparation arrangements, however, reference is made to the description above.

As shown in FIGS. 5A, 5B, 6A and 6B, a sample preparation arrangement 1 as shown in FIGS. 1A and 1B, or mutually exchangeably therewith a sample preparation arrangement 3 as shown in FIG. 3, which is here again illustrated in a simplified form and with a limited number of elements, the pipetting guide 106 is, in an embodiment, fixable in a first orientation (FIGS. 5A and 6A) in which the first surface shown in FIG. 4 faces towards the sample receptacles 102 (and the second surface 114 faces towards the viewer and is therefore indicated with a reference numeral). It is further fixable in a second orientation (FIGS. 5B and 6B) in which the second surface 114 faces towards the sample receptacles 102 (and the second surface 114 faces towards the viewer and is therefore indicated with a reference numeral). In this embodiment, operating positions for left-handed and right-handed operation are provided by flipping over the pipetting guide 106. This is shown in FIGS. 5A and 5B for a multi-channel pipette 500 and in FIGS. 6A and 6B for a single-channel pipette 500. Be it noted that the multi-channel pipette 500 shown in FIGS. 5A and 5B typically comprises more than the four channels shown and corresponds to the number of sample receptacles 202 in a multi-well plate. In all cases the axis 128 may also be arranged as shown for the axis 128a in FIGS. 2A and 2B.

FIG. 7 illustrates a microscopic examination device according to an embodiment of the invention which is designated 400 in its entirety. The microscopic examination device 400 comprises, in the embodiment shown, an inverse microscope 410 and a sample preparation arrangement 1 as shown before in specific embodiments. The sample preparation arrangement 1 is, for reasons of generality, illustrated as a transparent block and can take any configuration conceivable, particularly as illustrated before for sample preparation arrangements 2 and 3.

The microscopic examination device 400 as shown in FIG. 6 comprises a computer system 450. Alternatively or additionally, a microscope may be part of or connected to a distributed system. The microscopic examination device 400 may particularly be configured to perform a method described herein. The microscope 410 may be configured to take images and is connected to the computer system 450. The computer system 450 may be configured to execute at least a part of a method described herein. The computer system 450 may be configured to execute a machine learning algorithm. The computer system 450 and microscope 410 may be separate entities but can also be integrated together in one common housing. The computer system 450 may be part of a central processing system of the microscope 410 and/or the computer system 450 may be part of a subcomponent of the microscope 410, such as a sensor, an actor, a camera or an illumination unit, etc.

The computer system 450 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 450 may comprise any circuit or combination of circuits. In one embodiment, the computer system 450 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 450 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 450 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system X20 may also include a display device, one or more speakers, and a keyboard and/or controller, which can include a mouse, trackball, touch screen, voice-recognition device, or any other device that permits a system user to input information into and receive information from the computer system 450.

As shown in this specific example, the microscope 410, which may also be configured as a more general inverted microscope as known per se which does not comprise some of the components described hereinbelow, or which may also be configured to be a non-inverted microscope, comprises a microscope housing 402 enclosing an illumination optics 412, the sample preparation arrangement 100, particularly as a part of, or connected to a microscope stage 414, and an imaging optics 416.

An integrated sample chamber 418 is located within the microscope housing 412 and formed by a separated housing section 420 within said microscope housing 412. The housing section 420 comprises a hinged doorlid 422 which provides direct access to the microscope stage 414 for placing, exchanging or manipulating elements such as a multi-well plate 200 as shown hereinbefore onto the microscope stage 414 or, more precisely, in the sample preparation arrangement 1 when the doorlid 422 is opened. Instead of a hinged doorlid 422, a sliding door can be used as well.

The embodiment shown in FIG. 7 comprises, as mentioned, the microscope 410 in the form of an inverse transmitted-light microscope 410 where the illumination optics 412 is arranged within the housing section 402, while the imaging optics is located below the microscope stage 414 in a different section of the housing 412 which is not individually referred to by a reference numeral.

The imaging optics 416 typically includes a microscope objective and an image detector as the main components. The image detector usually comprises a camera which generates microscopic images which may typically be displayed on a display screen 452 outside the microscope housing 412.

The construction of the microscope housing section 420 allows—after closing the doorlid 422—to form a dedicated sample chamber which constitutes a preferably sealed space which can be incubated such that during microscopic examination/imaging of living samples like cells, the sample can be kept under favorable and stress-free environmental conditions. To this end, the housing section 420 comprises an interface 430 for connection of an external incubation environment conditioning unit 432 such that environmental conditions in the sample chamber 106 can be controlled.

LIST OF REFERENCE NUMERALS

1, 2, 3 Sample preparation arrangement
102 Base
104, 104a Receiving structure
106 Pipetting guide
108 Pipette guiding structure(s)
110 Flat region
112 First surface
114 Second surface
116, 118 Peripheric areas
120 Material indent(s)
126 Holding element
128, 128a Axis
200 Multi-well plate sample plate
202, 202a Sample receptacle(s)
300 Sample(s)
400 Microscopic examination device
402 Housing
410 Microscope
412 Illumination optics
414 Microscope stage
416 Imaging optics
418 Sample chamber
420 Housing section
422 Doorlid
430 Incubation interface
432 Environment conditioning unit
450 Computer system
452 Display screen
500 Pipette
502 Pipette tip

What is claimed is:

1. A microscopic examination device comprising:
a microscope and a sample preparation arrangement for preparing one or more samples to be examined in said microscope by pipetting one or more liquids into one or more sample receptacles for the one or more samples;
the sample preparation arrangement comprising a base, a receiving structure adapted to receive said one or more sample receptacles, a pipetting guide movably fixed or fixable in relation to the receiving structure; and
the pipetting guide comprising one or more pipette guiding structures positionable in relation to said one or more sample receptacles by pivoting the pipetting guide in relation to the base, wherein said one or more pipette guiding structures is or are positionable by pivoting the pipetting guide around one more axes, wherein said one or more axes include at least one of an axis normal to the base and an axis parallel to the base.

2. The microscopic examination device according to claim 1, wherein said one or more pipette guiding structures is or are further positionable by moving the receiving structure in relation to the base.

3. The microscopic examination device according to claim 1, wherein the pipetting guide is movably fixed or fixable to at least one of the base, an element connected with the base, a housing at least partially enclosing the base and a structure at least partially holding the base.

4. The microscopic examination device according to claim 1, wherein the pipetting guide (106) is pivotable into an operating position in which said one or more pipette guiding structures is or are locked in position in relation to said one or more sample receptacles.

5. The microscopic examination device according to claim 1, wherein the pipetting guide comprises a flat region with a first surface and a second surface extending parallel to the first surface, wherein said one or more pipette guiding structures comprises or comprise one or more v-shaped material indents in one or more peripheral areas of the flat region.

6. The microscopic examination device according to claim 5, wherein flanks of said one or more v-shaped material indents are slanted in relation to the first surface and the second surface of the flat region to define a working angle for a pipette guided by said one or more pipette guiding structures.

7. The microscopic examination device according to claim 5, wherein the pipetting guide is fixable to the base and/or an element connected therewith in a first orientation in which the first surface faces towards said one or more sample receptacles and/or in a second orientation in which the second surface faces towards said one or more sample receptacles.

8. The microscopic examination device according to claim 1, wherein the receiving structure is adapted to receive a plurality of sample receptacles in a geometrical arrangement to each other, wherein the pipetting guide comprises a plurality of pipette guiding structures, and wherein positions of at least some of the plurality of pipette guiding structures correlate with the geometrical arrangement of the plurality of sample receptacles.

9. The microscopic examination device according to claim 8, wherein the receiving structure is adapted to hold and to receive a multiwell plate comprising the plurality of sample receptacles and defining the geometrical arrangement.

10. The microscopic examination device according to claim 8, wherein the receiving structure comprises a plurality of wells being adapted to receive individual containers each forming one of the plurality of sample receptacles.

11. The microscopic examination device according to claim 1, wherein the receiving structure is adapted to receive a single sample receptacle, and wherein the one or more pipette guiding structures correspond to one or more positions at a bottom of the single sample receptacle.

12. A method of preparing one or more samples for microscopic examination comprising:
pipetting one or more liquids into one or more sample receptacles comprising one or more samples;
using a microscopic examination device comprising:
a microscope and a sample preparation arrangement for preparing one or more samples to be examined in said microscope by pipetting one or more liquids into one or more sample receptacles for the one or more samples;
the sample preparation arrangement comprising a base, a receiving structure adapted to receive said one or more sample receptacles, a pipetting guide movably fixed or fixable in relation to the receiving structure; and
the pipetting guide comprising one or more pipette guiding structures positionable in relation to said one or more sample receptacles by pivoting the pipetting guide in relation to the base, wherein said one or more pipette guiding structures is or are positionable by pivoting the pipetting guide around one more axes, wherein said one or more axes include at least one of an axis vertical to the base and an axis parallel to the base; and
wherein pipetting of said one or more liquids into said one or more sample receptacles comprises using the pipetting guide by positioning a pipette such that at least one pipette tip is positioned above a sample receptacle.

\* \* \* \* \*